US006961410B1

(12) United States Patent  
Castagna (10) Patent No.: US 6,961,410 B1
(45) Date of Patent: Nov. 1, 2005

(54) METHOD FOR CUSTOMIZING INFORMATION FOR INTERACTING WITH A VOICE MAIL SYSTEM

(75) Inventor: William D. Castagna, Ojai, CA (US)

(73) Assignee: Unisys PulsePoint Communication, Carpenteria, CA (US)

( * ) Notice: Subject to any disclaimer, the term of this patent is extended or adjusted under 35 U.S.C. 154(b) by 0 days.

(21) Appl. No.: 09/164,807

(22) Filed: Oct. 1, 1998

Related U.S. Application Data (60) Provisional application No. 60/060,812, filed on Oct. 1, 1997.

(51) Int. Cl.[7] .............................................. H04M 1/64
(52) U.S. Cl. .................................. 379/88.23; 704/260
(58) Field of Search ........................... 379/67.1, 88.01, 379/88.08, 84, 100.08, 211.02, 229, 88.02, 379/88.04, 88.05, 88.06, 88.18, 88.21, 88.24, 379/93.02, 93.24, 51, 88.23, 142.01, 357.03, 379/88.25, 88.26, 88.16, 76, 88.22, 70; 235/380; 455/435.3; 704/260; 345/474

(56) References Cited

U.S. PATENT DOCUMENTS

| 4,785,473 | A | * | 11/1988 | Pfeiffer et al. ........... 379/88.24 |
| 4,850,005 | A | * | 7/1989 | Hashimoto ................... 379/51 |
| 4,958,366 | A | * | 9/1990 | Hashimoto ............... 379/88.06 |
| 4,996,704 | A | * | 2/1991 | Brunson ................. 379/100.08 |
| 5,251,251 | A | * | 10/1993 | Barber et al. ............ 379/88.23 |
| 5,375,164 | A |   | 12/1994 | Jennings ...................... 379/88 |
| 5,388,146 | A |   | 2/1995 | Morduch et al. ............. 379/52 |
| 5,434,906 | A |   | 7/1995 | Robinson et al. ............. 379/67 |
| 5,434,910 | A |   | 7/1995 | Johnson et al. ............... 379/89 |
| 5,440,615 | A |   | 8/1995 | Caccuro et al. ............... 379/67 |
| 5,528,672 | A |   | 6/1996 | Wert ............................. 379/96 |
| 5,553,119 | A |   | 9/1996 | McAllister et al. ........... 379/67 |
| 5,586,171 | A |   | 12/1996 | McAllister et al. ........... 379/67 |
| 5,598,461 | A |   | 1/1997 | Greenberg .................... 379/67 |
| 5,608,784 | A |   | 3/1997 | Miller .......................... 379/88 |
| 5,771,276 | A | * | 6/1998 | Wolf ........................ 379/88.16 |
| 5,787,151 | A | * | 7/1998 | Nakatsu et al. .......... 379/88.23 |
| 5,825,871 | A | * | 10/1998 | Mark ..................... 379/357.03 |
| 5,860,064 | A | * | 1/1999 | Henton ....................... 704/260 |
| 5,905,774 | A | * | 5/1999 | Tatchell et al. .......... 379/88.04 |
| 5,930,700 | A | * | 7/1999 | Pepper et al. ............. 455/435.3 |
| 5,991,364 | A | * | 11/1999 | McAllister et al. ......... 379/229 |
| 6,005,928 | A | * | 12/1999 | Johnson ................. 379/142.01 |

(Continued)

FOREIGN PATENT DOCUMENTS

EP            0420527        4/1991

(Continued)

OTHER PUBLICATIONS

Westfall, et al., "Speech technology for telecommunications," BT Technology Journal, vol. 14, No. 1, Jan. 1996, pp. 9-27.

(Continued)

*Primary Examiner*—Fan Tsang
*Assistant Examiner*—Gerald Gauthier
(74) *Attorney, Agent, or Firm*—Mark T. Starr; Woodcock Washburn LL (57) ABSTRACT

A method and apparatus for personalizing voice messages to be used by a voice mail system in interacting with a user based on information provided by the user in an interactive communication between the voice mail system and the user. The method comprises the steps of creating sets of recorded messages according to distinct personalities for interacting with the voice mail system, selecting a recorded message from the plurality of sets of recorded messages based on interactive inquiries between the user and the voice mail system, and personalizing the selected recorded message responsive to the information provided by the user.

4 Claims, 3 Drawing Sheets

U.S. PATENT DOCUMENTS 6,031,549 A * 2/2000 Hayes-Roth .................. 345/474
6,101,241 A * 8/2000 Boyce et al. ............. 379/88.01
6,173,043 B1 * 1/2001 Finnigan ................... 379/88.08
6,272,467 B1 * 8/2001 Durand et al. .................. 705/1

FOREIGN PATENT DOCUMENTS

| | | |
|---|---|---|
| JP | 2-92143 | 8/1990 |
| JP | 5327909 | 12/1993 |
| JP | 6043900 | 2/1994 |
| JP | 8265440 | 10/1996 |

OTHER PUBLICATIONS

Attwater, et al., "Issues in large-vocabulary interactive speech systems," BT Technology Journal, vol. 14, No. 1, Jan. 1997, pp. 177-186.

Notice of Ground Rejection issued by Japan Patent Office dated Jul. 15, 2003.

Applicant's Foreign Associate's Communication regarding references dated Sep. 11, 2003.

* cited by examiner

METHOD FOR CUSTOMIZING INFORMATION FOR INTERACTING WITH A VOICE MAIL SYSTEM

CROSS REFERENCE TO RELATED APPLICATIONS

This application is a nonprovisional application of U.S. provisional patent application "VOICE MAIL SYSTEM AND METHOD WITH SUBSCRIBER SELECTION OF AGENT PERSONALITIES," U.S. Ser. No. 60/060,812, filed Oct. 1, 1997, having Will Castagna as the inventor. The 60/060,812 application is hereby incorporated by reference in its entirety.

BACKGROUND OF THE INVENTION

Prior art voice mail systems use series of pre-recorded messages to allow the voice mail system to interact with both incoming callers and subscribers to the voice mail system (those who have mailboxes on the system). Applications written for the voice mail system and the inputs made by incoming callers and/or subscribers determined which pre-recorded messages are played and the order in which they are played. These inputs are usually in the form of DTMF (Dual Tone Multi-Frequency) tones generated when the caller or subscriber presses a button on the telephone keypad. Some of the pre-recorded messages include context related information. A common example of such a message is, "You have <number> new <message/messages>." The "<number>" portion of the message is replaced by a pre-recorded message fragment of the appropriate number for the mailbox being accessed. Further, the system chooses whether to use a pre-recorded fragment for "message" or for "messages" depending on whether the numeric value of <number> is 1 or another number. Prior art voice mail systems typically use one set of prerecorded messages for all subscribers and callers. This one set of prerecorded messages also uses a single voice for all of the messages in the set. The same person (voice talent) records each of the messages.

A problem with the prior art voice mail systems is that different people find different speech patterns appealing. Different people tend to like and thus better understand different voice patterns. Aspects of voice patterns include fast or slow speaking, sing-songy speaking or monotonatic, pitch, dialect and the gender of the speaker. Voice patterns also can reflect different personalities of the speaker.

SUMMARY OF THE INVENTION

It is an object of the present invention to provide a method and apparatus for personalizing voice messages to be used by a voice mail system in interacting with a user based on information provided by the user in an interactive communication between the voice mail system and the user. The method comprises of creating a number of different sets of recorded messages according to distinct personalities and voice tones, selecting a recorded message from the different sets of messages interactive inquiries between the user and the voice mail system. In one embodiment, the selected message is further personalized by modifying the speed, dialect, and/or pitch of the message. In another embodiment, the recorded messages are automatically created corresponding to the user's own voice and speech patterns. In the preferred embodiment, a sample introduction from the number of sets of recorded messages is played for the user while the system is waiting for a selection from the user. When a selection is made by the user, the system confirms the selected recorded message by playing back a confirmation message using the same personality as the selected message. The recorded messages can be automatically selected for a given user/caller by using the Automatic Number Identification (ANI) information, Caller ID information, or voice recognition technology.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

DETAILED DESCRIPTION

Figure 1:
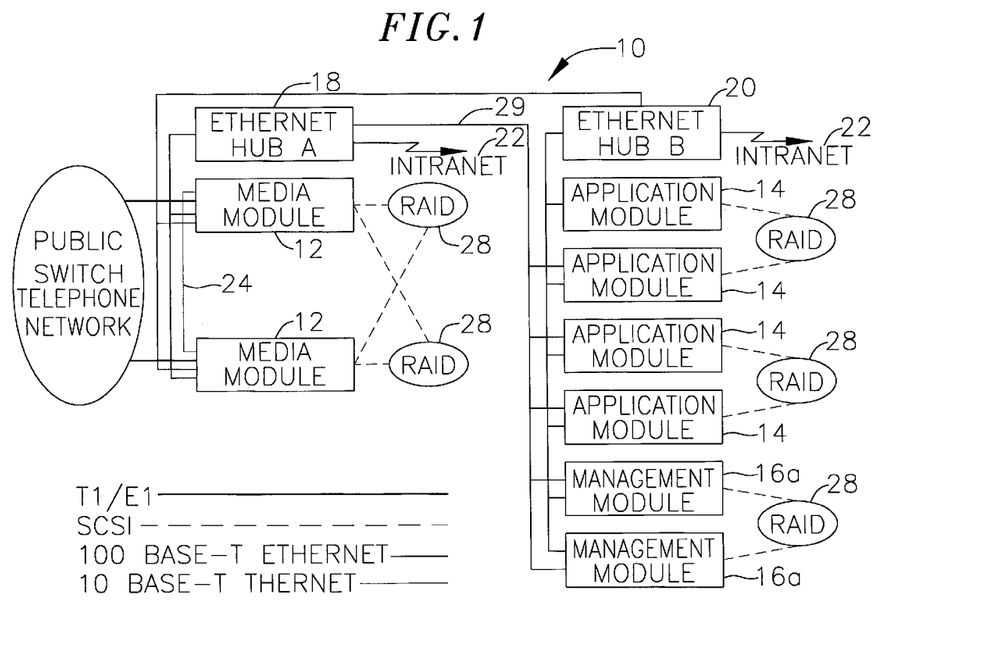
FIG. 1 is a block diagram of the telecommunications application hardware platform according to a preferred embodiment of the invention.

A block diagram of the telecommunications application hardware platform 10 used with the preferred embodiment is shown in FIG. 1. The typical telecommunications applications run on the platform include call answering (including voice, fax and data processing), multimedia messaging, voice recognition and call management. Despite having functionality beyond handling voice calls, for convenience, the telecommunications application hardware platform together with its various telecommunications applications will be referred to herein as the "voice mail system." The platform has three main elements, a series of media modules 12, a series of application modules 14 and a series of management modules 16. These three series of modules are interconnected using a dual high speed Ethernet backbones, centered around Ethernet Hub A 18 and Ethernet Hub B 20. Both Ethernet hubs are connected to an Intranet 22, which allows the platform to communicate to and receive commands from subscribers through their desktop computers and through the Intranet. Alternatively, any network other than traditional Intranets may be employed, including the Internet. A principle kept in mind in the design of the platform is the ability to offer extremely high operational availability of the platform and applications running on it.

The media modules 12 provide media storage, media flow (play/record), media transformation (Digital Signal Processing-DSP) resources and the telephony interfaces for the platform. The media module is capable of playing and recording multimedia messages (voice, fax, e-mail) from/to disk as well as supplying tone detection/generation, voice recognition, text to speech and fax modem services.

Each media module 12 uses N+1 power and RAID disk technologies to enhance its reliability and availability. Additionally, media modules are clustered to allow failover between modules in the event one of them should fail. Preferably, the operating system for the media module host CPU is Solaris.

Application modules are NT servers hosting Microsoft's Windows NT Server software. They host the applications and database services for the platform. Communication with media modules is via the media module API and remote procedure calls. Like the media modules, the application modules make use of N+1 power and RAID disks 30 and are themselves clustered for high availability operation.

The management module 16 is a specialized version of an application module. The management module is responsible for hosting the cluster management services and call manager application and is central point for the collection and control of the platform fault management and alarming. To support all of this, the management module contains extra hardware for connection to media module consoles (not shown), application module maintenance ports, and the system monitor. The system monitor provides fault monitoring for each of the elements of the platform as well as providing critical, major and minor relay connections to the facility alarm grid. It communicates with each management module across an RS232 link. In some configurations, the platform management services and applications may reside on the same NT servers.

The Ethernet hubs 18, 20 tie all of the media, application, and management modules together. Each module has dual 100 Base-T Ethernet connections 29 that terminate at two separate Ethernet hubs 18, 20. There is a third 10 Base-T Ethernet connection 24 between the media modules that is used for a heartbeat for a failover mechanism.

A media module 12 consists of a 20 slot VME enclosure, common control, T1 or E1 telephony interface cards, fax service circuit cards (optional), and a storage subsystem. All of these components are packaged in a NEBs compliant cabinet enclosure.

The media module 12 has four main components: media module enclosure power & package; common control; telephony/DSP/service circuits/module; and media storage.

The preferred embodiments includes a pair of media modules each of which can host up to a maximum of 240 telephony and 240 fax ports. However, alternative embodiments include additional media modules.

The media module common control consists of the host CPU, SCSI host interfaces, Ethernet controllers and the environmental monitor.

The media module host CPU is packaged in a three slot, 6U VME bus module. The CPU requires a fourth backplane slot when Sbus modules are installed. The Sbus module carrier is used int he preferred embodiment. For the preferred embodiment the media module host CPU supports: Processor: Dual Hyper SPARC; Memory: 64 to 512 MB ECC DRAM; Sbus: Two standard Sbus slots; SCSI: Two fast/narrow SCSI-2 ports; Ethernet: Two 10 Base-T Ethernet ports; and Serial I/O: Four RS 232 ports.

The host CPU can support several daughter board processor modules. The preferred embodiment will use processor modules with speeds of either 125 MHz, 150 MHz, 166 MHz or 200 MHz depending on performance requirements. Single, dual and quad processor configurations are possible in alternate embodiments.

The host CPU can accommodate up to 512 MB of error correcting [ECC] memory in increments of 64 MB. The ECC provides single bit error correction and multiple bit error detection on a per byte basis. The amount of memory populated will depend on performance requirements.

The media module includes a 100 Base-T Ethernet controller that connects to the 100 Base-T Ethernet hub designated as network B. This network serves as the backup network for network A.

Each media module has an environmental monitor [EM] to monitor and report on the system's condition and operating environment. The controller is a single slot VME card which the CPU interrogates across the VME bus.

The environmental monitor provides: RAID power and fan status for up to 3 RAID shelves; Media Modules cabinet temperature; VME enclosure temperature; VME backplane voltage monitor (software readable): +5 volts, +12 volts, −12 volts; Cabinet fan status; VME enclosure power and fan status; Control of the display panel fault LED; Signaling of media module faults to a management module; Remote VME bus reset (to reset the buddy media module); Signaling a fault to a management module for the buddy media module; Voltage test points for VME backplane voltages; LED indicators for VME backplane voltages; and 16 LED indicators for media module fault conditions.

Telephone network and service circuit interface modules provide the telephony, DSP and service circuit resources for a media module. The modules are made up of a base board and one or more daughter cards combined into a single 6U VME64 module.

The T1/Voice interface card consists of four T1 spans and the DSP resources to support basis voice functionality for 96 channels. The configuration as described below occupies a single VME backplane slot. VME base board with an Intel i960 processor, 4 MB of DRAM and two T1 spans; Dual span T1 daughter board; and Signal processor daughter board with six Motorola 66 MHz 56303 DSPs.

The E1/Voice interface card consists of four E1 spans and the DSP resources to support basis voice functionality for 90 channels. The forth span, allowing 120 channels, will be enabled with in a future version of the hardware. The configuration as described below occupies a single VME backplane slot. VME base board with an Intel i960 processor, 4 MB of DRAM and two E1 spans; Dual span T1 daughter board; and Signal processor daughter board with six Motorola 66 MHz 56303 DSPs.

The fax module has the processing resources to provide 24 channels of fax transmit and receive functionality in a single VME slot.

A fax module consists of: VME base board with an Intel i960 processor, 8 MB of DRAM; Signal processor daughter board with six Motorola 66 MHz 56303 DSPs.

Media storage is accomplished using a dual controller RAID system. The RAID configuration is 0+1 (mirrored and stripped).

The specifics of the RAID system described here are unique to the Artecon product. Alternatively, RAID systems from other manufacturers may be used. SCSI bus termination is done externally to the RAID controllers so that the controllers may be hot swapped without interfering with the SCSI bus termination.

An application module consists of an industrial grade PC, common control, and a storage subsystem.

The preferred embodiment supports two pairs of application modules and their storage subsystems packaged in a NEBs compliant cabinet enclosure. Each pair of application modules shares a single shelf dual controller RAID system.

Common control of an application module includes the host CPU, a video controller, a SCSI controller, two Ethernet controllers and an environmental monitor.

The host CPU is a passive backplane single board computer with an ISA and PCI bus interface. It is designed to plug into a PICMG compatible passive backplane that provides both ISA and PCI card slots. For the preferred embodiment the application module host CPU supports: Pentium Pro processor; custom BIOS; 128 MB ECC DRAM; floppy controller port; IDE interface; and two RS232 ports.

The processor in the application module of the preferred embodiment is a Pentium Pro operating at a core speed of 200 MHz and a bus speed of 66.67 MHz.

The BIOS contains custom extensions to allow remote serial communications with the host when the operating system is not loaded. Communication is supported across comm port 1. This remote preboot access permits maintenance personnel to interrogate/modify the BIOS CMOS settings and to run diagnostics when a system is off line.

The host CPU can support up to 512 MB of error correcting [ECC] memory. The preferred embodiment provides 128 MB of ECC memory. The ECC provides single bit error correction and multiple bit error detection on a per byte basis.

Application modules are designed to operate without a keyboard or monitor; however, a video controller is still required by the Windows NT operating system to allow the system to boot. All application modules are equipped with a generic video controller. Depending on a particular system, they may be either PCI or ISA cards. The video controller's I/O is not routed to the bulkhead, but it is accessible from the rear of the application module chassis.

Each application module has two PCI bus 100 MB Ethernet interface cards. The Ethernet interface is 100 Base-T.

Each application module has an environmental monitor [EM] to monitor and report on the system's condition and operating environment. The controller is a single slot ISA bus card which the CPU interrogates across the ISA bus.

The EM has a ISA slave interface that occupies 4 bytes in the ISA I/O address space.

The environmental monitor provides: RAID power and fan status; application module cabinet temperature; application module cabinet fan status; PC enclosure temperature; PC enclosure fan status; PC enclosure power status; host processor (Pentium Pro) temperature; ISA/PCI backplane voltage monitor: +5, −5 volts, +12 volts, −12 volts; control of the cabinet's display panel fault LED; control of the PC enclosure's thermal warning LED; signaling of application module faults to a management module; CPU reset (to reset itself) Note: a CPU reset resets all boards in the AM; remote CPU reset (to reset the buddy application module); and signaling a fault to the management module for the buddy application module.

The application module has a PCI, differential, fast/wide SCSI-2 host controller for connection to the RAID system. For compatibility with NT clustering, the controller's SCSI ID can be changed programmatically.

Storage is accomplished using a dual controller RAID system. The RAID configuration is 0+1 (mirrored and stripped).

Again, SCSI bus termination is done externally to the RAID controllers so that the controllers may be hot swapped without interfering with SCSI bus termination.

The management module uses the same components as an application module. In addition, it has peripheral storage devices and expansion serial ports to accommodate console/ maintenance port connections and alarming.

The preferred embodiment was one pair of management modules and their storage sub-system packaged in a NEDs compliant cabinet enclosure.

A second PCI SCSI host controller that interfaces to the tape drive is provided in management module 2 16*b*. This controller has a single ended, fast/wide SCSI-2 interface.

A tape drive and CDROM are equipped in one of the management modules. Failover/redundancy is not provided for in these peripheral devices.

For doing database back ups, a four millimeter SCSI, DAT tape drive is installed in management module 2 16*b*. The tape is connected to a SCSI host controller separate from the one used for the RAID system. The tape storage capacity is 4 GB.

For media distribution, installation and upgrade a 12×speed CDROM is installed in management module 16*a*. The CDROM interfaces to the host CPU's on board IDE bus.

The preferred embodiment uses dual IEEE 802.3 compliant 100 MB Ethernet networks to connect all of the internal modules. Both networks are built around 12 port 100 MB repeater hubs that connect to each of the networked modules.

Each hub has a single power supply. The hubs are connected to separate input power feeds to allow maintenance to be performed on one of them without disturbing the other.

Two ports from each hub are routed to the management module's I/O bulkhead. These provide the external network access to the cluster.

Each medial module can support a maximum of 240 telephony ports. The ports can be either T1 or E1, but both may not be mixed within the same backplane.

For a T1 system a maximum of three 4 span line cards may be installed in each media module. In this configuration only two of the four spans are usable on the third line card.

For an E1 system a maximum of three 3 span line cards may be installed in each media module. In this configuration only two of the three spans are usable on the third-line card.

The preferred embodiment supports a 24 port fax card. Each media module can accommodate a maximum of 10 fax cards for a total of 240 fax ports.

The minimum number of disks allowed in any RAID configuration is 3. In the media module the maximum number of RAID disks allowed is 15 with 14 available for storage and 1 reserved for a global spare. In the application and management modules the maximum number of RAID disks allowed is 7 with 6 available for storage and 1 reserved for a global spare. In each RAID system two slots are reserved for building new RAID sets when performing disk upgrades.

The platform is designed for modular hardware serviceability. The following components support live insertion/ removal and may be added or replaced with no impact on system operation: media module (including RAID disk drives and controllers; VME & RAID power supplies & fans; telephone network interface modules; fax service circuits; and CDROM drive); and application module/management module (including RAID disk drives and controllers; AM/MGM & RAID power supplies & fans; and AB switch power).

If the need arises to replace a component that does not support hot swap, redundancy allows failing over to another resource during the maintenance period.

The platform provides the hardware capability to perform software upgrades without shutting the entire platform down. Upgrades are performed incrementally on each module until all modules are at the new software level. There may be some degradation in the level of service during the time a module is being upgraded.

For upgrade purposes, a single media module may be removed from service, upgraded and returned to service with the only result being reduced port capacity during the down time interval.

An individual media module must be removed from service to upgrade any of the common control components.

Network interface modules are hot-plug and may be added or removed from a media module without service interruption.

Fax cards are hot-plug and may be added or removed from a media module with service interruption.

Increased storage upgrades are expected to occur with each advancement made in disk drive storage capacities. The platform architecture provides a transparent upgrade path that requires no down time to the media module being upgraded. Requirements for the upgrade are as follows: two open slots in the RAID subsystem; and all disk drives in a logical unit must be upgraded at the same time.

The upgrade capabilities for the application and management modules are identical.

The application modules are configured in redundant pairs. One application module may be removed from service and upgraded without interrupting service to the cluster.

Application and management modules must be removed from service to service any of the common control components.

In the preferred embodiment there is no present need to upgrade the Ethernet networks exists, however, the platform Architecture allows for network upgrades to accommodate expansion in future releases. As the cluster grows, the network structure can be migrated to higher speed Ethernet, ATM of other network technologies.

In the preferred embodiment, the application modules include the applications that supply the functionality of voice mail system that is apparent to a user of the voice mail system. As stated above, the applications typically include the functionality of call answering (including voice, fax and data processing), multimedia messaging, voice recognition and call management, it can include any telecommunications functions. In the preferred embodiment, the application includes several sets of pre-recorded messages. All of the messages of a particular set of pre-recorded messages are recorded by the same voice talent. However, different sets of pre-recorded messages may be recorded by different voice talents. Additionally, each set of pre-recorded messages is recorded by the voice talent using the same basic speed, dialect, pitch and personality. Of these different voice qualities used in recording a set of messages, personality is of importance. The same voice talent can record messages using any of a variety of distinct personalities and emotional qualities, such as happy, serious, verbose and terse. When multiple voice talents are also used, the number and variety of different voice/personality combinations is considerable.

The preferred embodiment then allows the user to select one from the various sets of pre-recorded messages stored in the application module. Once a set of pre-recorded messages is chosen, that set represents the subscriber's chosen "agent" for interacting with the voice mail system. In an alternative embodiment, he selected pre-recorded message can be further personalized by varying the speed, dialect, and/or pitch of the message using digital signal processing techniques.

Figure 2:
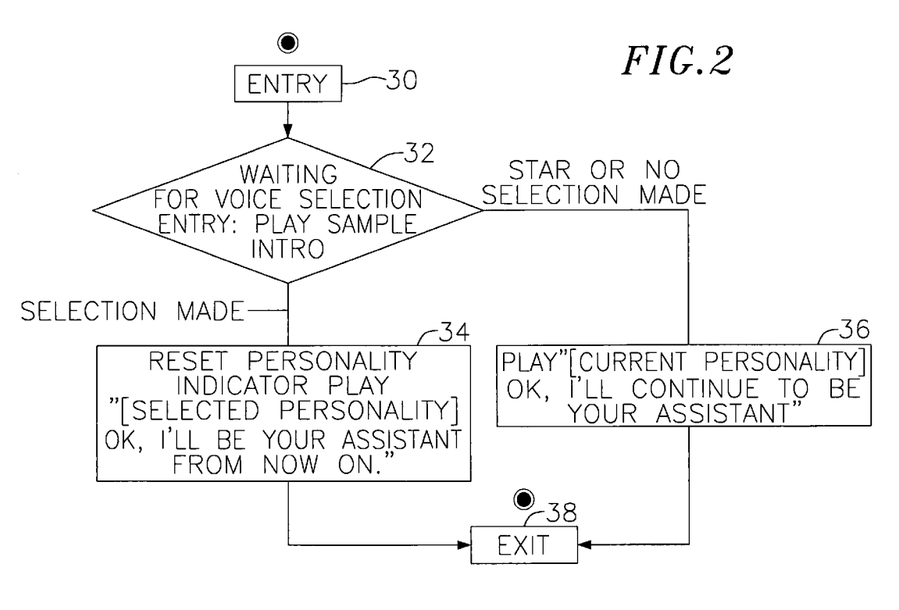
FIG. 2 is a flow chart of the process used by subscriber in conjunction with the preferred embodiment of selecting an agent for that subscriber.

The preferred embodiment employs a brief interview process shown in FIG. 2 to allow the user to select the agent with the personality preferred by the user. When a subscriber first uses the voice mail system, or decides to change their agent, the selection process begins at entry point 30. In block 32, the system begins waiting for a voice selection response from the subscriber. At the same time, a Sample Introduction, which introduces the agents to the subscriber, is played. In one embodiment the Sample Introduction follows the following script. In the following script, Agent #1 is the default agent in the case of a new subscriber, or the currently selected agent for an existing subscriber who is changing their agent.

Agent #1: You may select among <number of voices available (n)> assistants. This is what we sound like . . .

Agent #1: It's either my voice, the one you've heard before . . .

Agent #2: . . . or it's me. You can hear my voice . . . . .
.

Agent #n: . . . or you and your callers can hear my voice.

Agent #1: For my voice, press 1.

Agent #2: For my voice, press 2.

Agent #n: For my voice, press <n>.

It is noted that the phrase used to introduce each new voice (the "personality signature phrase"), such as Agent #2's " . . . or it's me. You can hear my voice . . . " usually contains slightly different words to make up the introduction. The words used are chosen to be consistent with the agent's personality.

If the user responds to the Sample Introduction by pressing a key on their telephone between 1 and n, indicating a valid choice of an agent, the branch to block 34 is taken. In block 34, a message, spoken by the just-chosen agent, states, "OK, I'll be your assistant from now on." Of course, the words used by the chosen agent to communicate the choice of that agent may be different for each agent, reflecting that agent's personality. After block 34, the agent selection process exits at block 38.

If the user does not respond to the Sample Introduction or responds with an inappropriate key (not a number between 1 and n), the path from block 32 to block 36 is taken. In block 36, a message, spoken by the prior agent (Agent #1 in the case of a new subscriber), states, "OK, I'll continue to be your assistant." Again, the words used by the chosen agent to communicate the retention of the prior agent may be different for each agent, reflecting that agent's personality. After block 36, the agent selection process exits at block 38.

With respect to the pre-recorded messages needed to implement the agent selection process, the voice for each agent must record each of the numbers from 1 to n and each of the following phrases:

You may select among <number of voices available (n)> assistants. This is what we sound like . . .
 It's either my voice, the one you've heard before . . . ;
 ["middle of list" intonation] <personality signature>;
 ["end of list" intonation] <personality signature>;
 For my voice, press . . . ;
 OK, I'll be your assistant from now on; and
 OK, I'll continue to be your assistant.

Each of these phrases is needed for each agent because the current choice of agent, which could be any of the agents for a particular subscriber, determines which agent's recordings are used for each of the phrases. Again, the specific wording used by a particular agent to convey the message of each of the phrases can vary with the personality of the agent.

It has been found that even the short exposure to a voice and personality that is given in the agent selection process shown in FIG. 2 supplies subscribers with a sufficient amount of information from which to choose a favorite agent. In particular, most subscribers can immediately choose their favorite voice/personality after listening to the short personality signatures provided to them. Alternatively, though, longer exposure to the different agents can be provided. In another alternative, the system can conduct an interview process to try to determine for the subscriber which agent is most likely to appeal to them.

As voice mail system subscribers use a particular voice mail system more often than outside callers, the choosing of a personal agent is more important for subscribers than callers. However, using ANI information contained in the data the voice mail system-receives with each incoming call that identifies the calling stations phone number, the voice mail system can automatically use a selected agent for all calls received from a particular phone number. Alternatively, Caller ID information or any other method of determining the calling parties number can be used in place of or in addition to ANI information. In this way, the time involved in selecting an agent by a caller can be worthwhile for callers who call the particular voice mail system often from the same phone number. Alternatively, known voice recognition technology can be used to identify incoming callers by analyzing the spoken response to a system generated prompt, such as, "Hello, you've reached the office of Joe Smith, whom may I say is calling?" The response is then processed by the voice recognition software and if the caller is recognized, the caller's choice of agent is then used.

Figure 3:
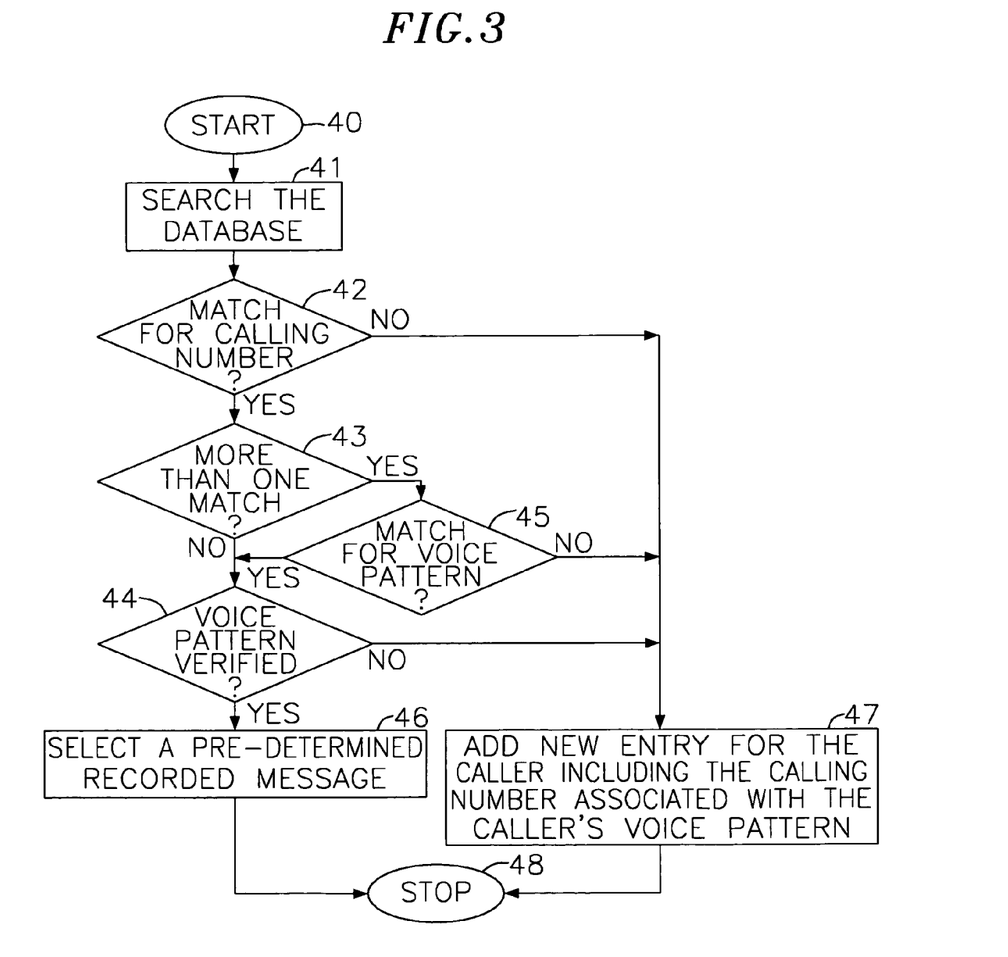
FIG. 3 is a flow chart of the process used by the system for automatically selecting an agent using a combination of ANI and voice recognition methods for caller identification.

FIG. 3 illustrates a flow chart for a combination of the ANI and voice recognition methods of caller identification, in which a database is provided to store associations and correlations between callers identified by the voice recognition software and the number from which they have called, according to the ANI information. Thus, when a call comes into the system, the database is first checked to determine if there are any entries corresponding to the ANI information for the incoming call as shown by blocks 41 and 42. If there is only one entry for the calling number, the system answers the call, "Hello, is this Joe Smith?" using the agent that Joe Smith has chosen before. Then, analyzing the response to this prompt, the voice recognition software can verify that the caller's voice matches the systems records for Joe Smith's voice as depicted by block 43 and 44. If the response is a "yes" and the voice matches a record in the database, i.e., a positive verification is confirmed in block 44, the system selects a pre-determined recorded message for the caller as shown is block 46. If the voice does not match, or says "No", i.e., not verified according to block 44, the system first checks to determine if the voice of the response matches any other records in the database as depicted by block 45. As illustrated by block 45, if there is a match, the system asks if the caller is the person in the database for the matching voice to verify their identity in block 44. If there are more than one voice entry for the calling number, the system searches the database for the given calling number to find a match for the voice, shown by block 45, and then proceeds to the verification step (block 44) as described above. If the system does not find a match in the database for the calling number or the voice, or if the caller does not verify their identity as matching the person selected from the database, the system proceeds to add a new entry for the caller, with both the ANI information and voice pattern information as demonstrated by block 47.

Using the same methods, a subscriber can be identified when they call into the system from an outside telephone. In this instance, the subscriber himself or herself has an entry in the database. This database includes the subscriber's various telephone numbers, such as home, office and mobile numbers. Thus, if the system receives a call with ANI information matching any of the subscriber's various telephone numbers, there is a high likelihood that the caller is the subscriber. When an outside caller is identified by the system as a subscriber, that subscriber's agent is used to handle to call.

The identification methods also allow a subscriber to select an agent for anyone in their address book. This is of particular usefulness when the subscriber knows that a person in the database is more comfortable with a language different than the language used by the system's default agent. In an example of this situation where a particular caller prefers to speak French, the subscriber can have the voice mail system always use a French language agent once it has identified that caller.

Additionally, the voice mail system can be set up to allow outside callers who are frequent users of the voice mail system to choose an agent that is preferable to them. Again, as with the caller who prefers a different language, once the caller is identified by the voice mail system, the database is accessed and the caller's chosen agent is used for the duration of the call. In this case, though, no subscriber involvement is necessary in the selection of the preferred agent for that caller.

In an alternative embodiment, using known weaving technology (voice patterns of someone reading a sentence or paragraph are taken and the words/phonemes in the sample are used to make new sentences) the system can create an agent based upon the user's own voice and speech patterns. Thus, a user reads a paragraph (or however much sample is needed) and the recording of that reading is used to automatically create the pre-recorded messages for that user's agent.

The database that stores information about callers based on ANI information, voice recognition or a combination of these techniques allows further functionality to the voice mail system apart from the selection of a preferred agent personality. This additional functionality centers around the concept of a personal assistant, enabled by expanding the incoming caller database into a telephone user interface (TUI) address book. The address book contains phone numbers, fax numbers, other numbers, e-mail addresses and other information that will facilitate intelligent handling of calls to and from the people in the address book.

Each entry in the address book contains an entry number, a caller-spoken name utterance, a subscriber-spoken utterance of the entry's name, the entry's phone number, and the entry's fax number (optional). As caller messages are left for the subscriber with the voice mail system, the caller-spoken names, ANI and keyed-in phone numbers are saved with the message (if requested by the greeting option selected and given by the caller). When the subscriber has listened to a message for which at least some phone number information is available, one option that becomes available is to add this caller to the address book. If this option is selected, the voice mail system will prompt the subscriber to say the spoken name of the caller, verify the phone number to be stored, and enter the fax number if available and not already entered by the caller.

Names may also be added manually by selecting the appropriate option under a "Setup/Address Book" menu of the voice mail application. After selecting the slot into which the entry will be placed, the subscriber-spoken utterance of the entry's name, the phone number and the fax number are entered manually.

Each slot in the address book is numbered, starting with one. When a person is assigned to a slot, they stay there with that number until manually deleted or replaced via the address book maintenance options (Add, Change, Delete, Review One, Review All) in the "Setup/Address Book"

menu. Deletions do not reorder the list, and additions are placed in the slot number specified by the subscriber (the first available slot is suggested by the system). Any information in a slot may be replaced (Change command).

One function available to the system with TUI address book is calling people from the information in the address book. To call a person in the address book the subscriber presses a number associated the person. If there are 10 or more entries, the selection of the entry to dial is considered complete when the "#" key is pressed or a timeout occurs. If the number of entries is less than 10, the attempted outdial occurs immediately upon receipt of the single-digit keypress, without waiting for a timeout. The phone number from the address book is then used to dial the desired person.

Alternatively, the phone number for a person in the address book can be dialed when the subscriber speaks the person's name to the voice mail system, using voice recognition. In one embodiment, the voice recognition relies on the subscriber having spoken the person's name to the voice mail system when the person's address book record was created. In another embodiment, a voice recognition name template is created from the text representation of the person's name and stored as an entry in the address book. The person is then dialed by a voice command matching the voice recognition name template.

Another feature is automatically adding an entry to the subscriber's address book from the information stored in an incoming voice message to the subscriber. Particularly if the voice mail application prompts the caller to say their phone number at a particular point in the call, the phone number is converted into digits which are automatically stored in the caller's entry in the address book should the subscriber add the person to the address book. The address book also allows the automatic addition of a person to the subscriber's address book from the information stored in an incoming e-mail message to the subscriber.

The system stores extensive information about the subscriber's use of a particular entry in the Address Book as part of the entry. Thus, for example, when there is a question by the voice recognition software whether the subscriber said "John Smith" or "Joe Smith," the system can make an intelligent guess that the subscriber intended to dial Joe Smith because that subscriber calls Joe Smith once a week on average and that subscriber hasn't called John Smith in over six months.

The system also stores information about the number and frequency of calls from a particular entry in the address book as part of the entry, as well as storing information about how the subscriber treats this caller and/or messages from this caller. With this information, the system can predict how the subscriber will want to treat a particular call/message. For example, if the subscriber always immediately returns calls from their mother, the voice mail system presents the message from the subscriber's mother and automatically asks if the subscriber would like the system to place a return call immediately. Alternatively, if a subscriber routinely sends calls from a particular caller to be answered by the voice messaging function, the system will present the call with a statement such as, "Mr. X is calling, I will route the call to voice mail unless you press the star key . . . " The same information can be used by the voice mail system to make an internal decision to promote an address book entry to a VIP list based on subscriber's treatment of calls and messages from entry.

In an alternative embodiment, a visual graphic based computer interface is used to communicate between the voice mail system and the subscribers in all of the functions described above instead of using voice based menus used over the subscriber's phone as described above.

Another feature of the preferred embodiment is automatically adjusting which pre-recorded messages are played at different points in user interaction based upon the user's competence in interacting with the system, as perceived by the voice mail system. In almost any particular point in the interaction with a voice mail system, while there is one particular piece of information that needs to be communicated to the user, the manner of communicating this information can range greatly along the spectrum from terse to verbose. Generally, experienced users prefer more terse messages while inexperienced users appreciate more verbose messages. In a preferred embodiment, the system monitors various parameters such as the frequency at which the user reaches a particular point in the system where a message is played, errors made by the user (determined by hangups followed by immediate return calls, backups in a menu hierarchy, etc.), multiple long pauses without user input at the same point in the system on consecutive calls (as opposed to singular pauses which may be the result of the user being distracted/interrupted while using the system), and how quickly a user interrupts a message with a selection (e.g., DTMF tone).

A preferred embodiment allows the use of these detection criteria to be used both for changing the message played at a local point in the system or for making global changes in the level of message played to a particular user. This process is called flexing the prompt levels and the specific way the various parameter are programmed to affect the flexing of prompt levels is called the flex behavior of the system. Of course, the user is allowed to override the system and manually select the terseness of messages either locally or globally. Last, as with the selectable agent personalities, while mostly applicable to internal users of the system, the invention may also be applied to incoming callers, identified by the ANI information received with the call or any other manner of identifying the caller, including voice recognition as discussed above.

The system also allows the fine-tuning of the flex behavior by individually setting all of these "flex-triggers" on a state-by-state basis, allowing the application designer very precise control over flex behavior throughout the application. For example, items on the main menu, used more frequently, might flex after 5 correct uses, whereas the selection of a greeting style (which includes a long preamble before the menu at the beginner level) might flex after only two uses.

Further, this would also allow an entire set of flex settings to be associated with a "language," allowing the application designer to adjust flex behavior to be appropriate for various languages/personalities provided with the application.

In a preferred embodiment, there are three levels of prompting and four possible settings of a subscriber's prompt level:

Flex—this setting automatically adjusts prompts among the three available levels to accommodate the subscriber's experience level at a number of pre-defined states in the user interface, adjusting the level up (or down) as appropriate.

Training—these are explanatory prompts that provide all of the information a subscriber might require to understand what the next appropriate response on their part needs to be.

Standard—these are concise prompts, asking for the subscriber's response directly, with little or no explanation; they assume the subscriber has progressed beyond the "training" stage.

Advanced—these are tightly edited prompts, using as little verbiage as possible to prompt for the desired response.

When the Flex level is selected, at pre-defined states in the user interface, the preferred embodiment adjusts its prompts among the three available levels to match the subscriber's level of experience with a particular activity. In any state within which prompt level is not tracked, prompt level is inherited from its parent state.

In order to adjust prompt levels appropriately, the system tracks the subscriber's experience at each of the predefined states within the call flow, adjusting in either direction based on both usage and the length of time since the last use of the function. For example, if the subscriber successfully completes a given action (based on valid keypresses and/or error tones received) a certain number of times, the prompts are abbreviated by one level. If, on the other hand, they fail a certain number of times, or if they have not attempted this particular action for more than "n" calendar days, the prompts are lengthened by one level.

The flex level is also adjusted based upon a combination of the total number of times a particular menu item has been used by a subscriber and the number of uses in a recent time period by the subscriber. Thus a subscriber who has used a menu item many times in the past, but has not used it in the last three months may be given a lower flex level than a subscriber who has not use the menu item nearly as many times total, but has used the menu item ten times in the last week. On the other hand, the subscriber who has used the menu item many times in the past, but has not used it in the last three months should probably be placed at more advanced flex level than a subscriber who has used the menu item only two times, but both uses were in the last month.

Whenever the subscriber responds to a particular prompt with silence, the Training level's version of that prompt is played next, providing more information about the response expected (no permanent adjustments are made to prompt level; this is isolated behavior on a prompt-by-prompt basis).

The subscriber has the option to lock all interaction at a certain level, regardless of experience. (In areas where lack of instruction could result in loss of information or other undesirable result, verbose prompts are given, even at the Advanced level).

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of the embodiments that fall within the true scope of the invention.

What is claimed is:

1. A method of personalizing voice messages to be used by a voice mail system comprising the steps of:
   creating a plurality of sets of recorded messages, wherein each message has a distinct mood, and wherein each set of said sets is identifiable by an agent, said sets being for interacting with the voice mail system;
   presenting a user of the voice mail system with interactive inquiries to enable the user to identify the agent; and
   selecting a recorded message from the plurality of sets of recorded messages based on the interactive inquiries between the user and the voice mail system, wherein said user identifies said set by choosing a particular agent message, the selecting step comprising:
   searching a database having entries for associations between voice patterns of users identified by a voice recognition system and calling numbers according to ANI information to find a match for a calling number;
   searching the database to find a match for the user's voice pattern associated with a matched calling number;
   seeking confirmation from the user for a matched voice pattern using a previously selected mood; and
   selecting a pre-determined recorded message based on the matched voice pattern.

2. The method of claim 1, further comprising the step of adding a new entry in the database for the user associating the calling number with the user's voice pattern if no match is found.

3. A method of personalizing voice messages to be used by a voice mail system comprising the steps of:
   creating a plurality of sets of recorded messages, wherein each message has a distinct mood, and wherein each set of said sets is identifiable by an agent, said sets being for interacting with the voice mail system;
   presenting a user of the voice mail system with interactive inquiries to enable the user to identify the agent; and
   selecting a recorded message from the plurality of sets of recorded messages based on the interactive inquiries between the user and the voice mail system, wherein said user identifies said set by choosing a particular agent message, wherein the plurality of sets of recorded messages are used for system prompts to the user,
   wherein the interactive inquiries between the user and the voice mail system is determined by the system according to the user's competence in interacting with the system;
   wherein the user's competence is determined by a plurality of detection criteria monitored by the system, and
   wherein a detection criterion is the frequency at which the user reaches a particular point in the system.

4. An apparatus for personalizing voice messages to be used by a voice mail system, comprising:
   an application module;
   a management module;
   a media module interconnected to the application module and the management module;
   a storage medium connected to the media module, the management module, and the application module;
   means for creating a plurality of sets of recorded messages according to distinct mood for each such set for interacting with the voice mail system, each set being identifiable by an agent;
   means for presenting a user of the voice mail system with interactive inquiries to enable the user to identify the agent, whereby a sample of messages from different agents is provided to said user; and
   means for selecting a recorded message from within areas of the plurality of sets of recorded messages based on the interactive inquiries between the user and the voice mail system whereby the user identifies the set identifiable by that agent, the means for selecting comprising:
   means for searching a database having entries for associations between voice patterns of users identified by a voice recognition system and calling numbers according to ANI information to find a match for a calling number;

means for searching the database to find a match for the user's voice pattern associated with a matched calling number;

means for seeking confirmation from the user for a matched voice pattern using a previously selected mood;

means for selecting a pre-determined recorded message based on the matched voice pattern; and means for adding a new entry in the database for the user associating the calling number with the user's voice pattern if no match is found.

* * * * *